Figure 1:
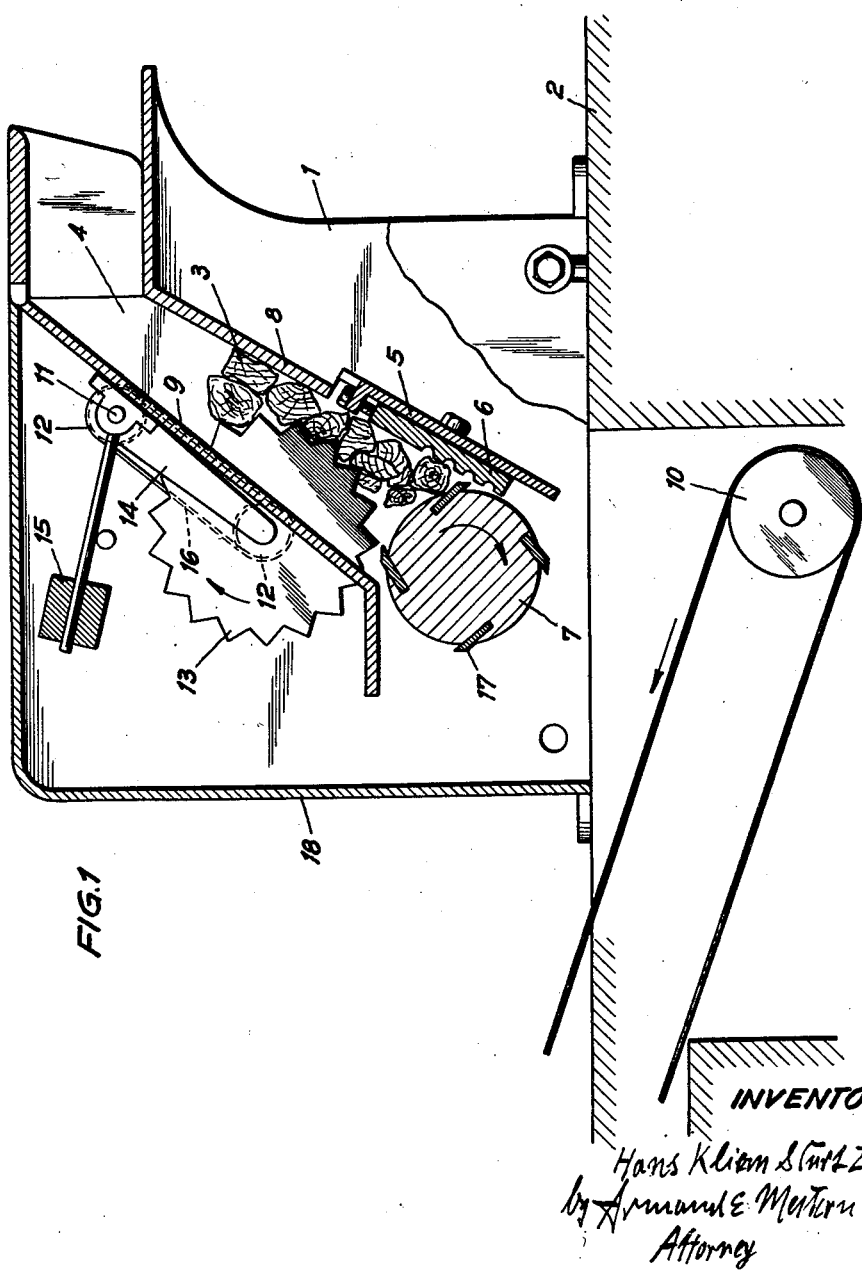

March 12, 1957 H. H. R. KLIEM ET AL 2,784,753
MACHINE FOR CHIPPING WOOD
Filed May 14, 1952 5 Sheets-Sheet 1

INVENTORS
Hans Kliem & Curt Zweig
by Armand E. Mestern
Attorney

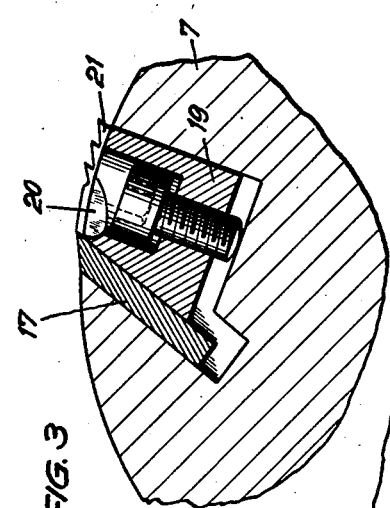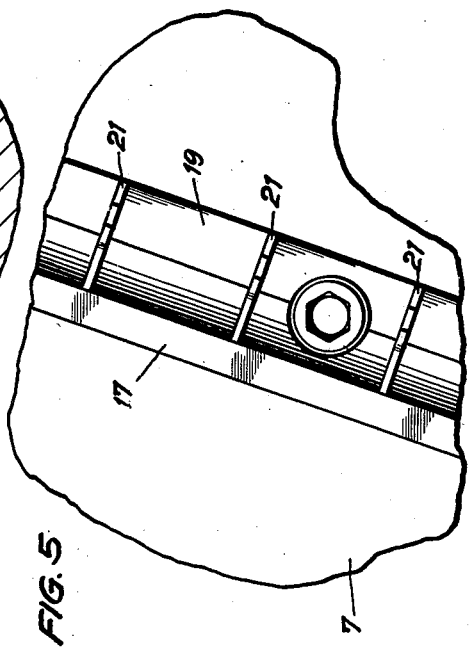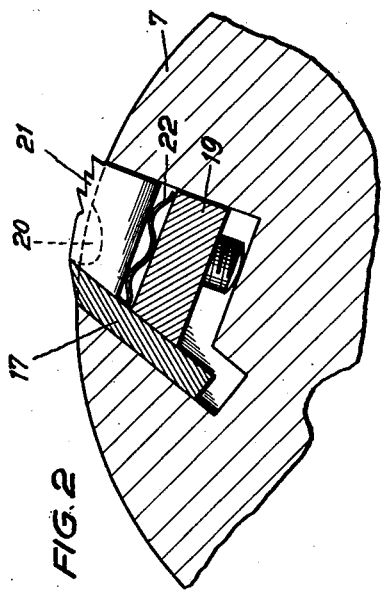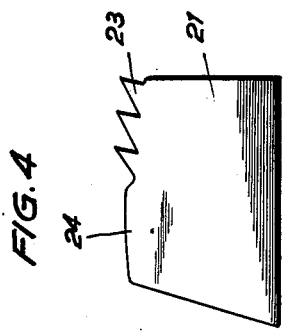

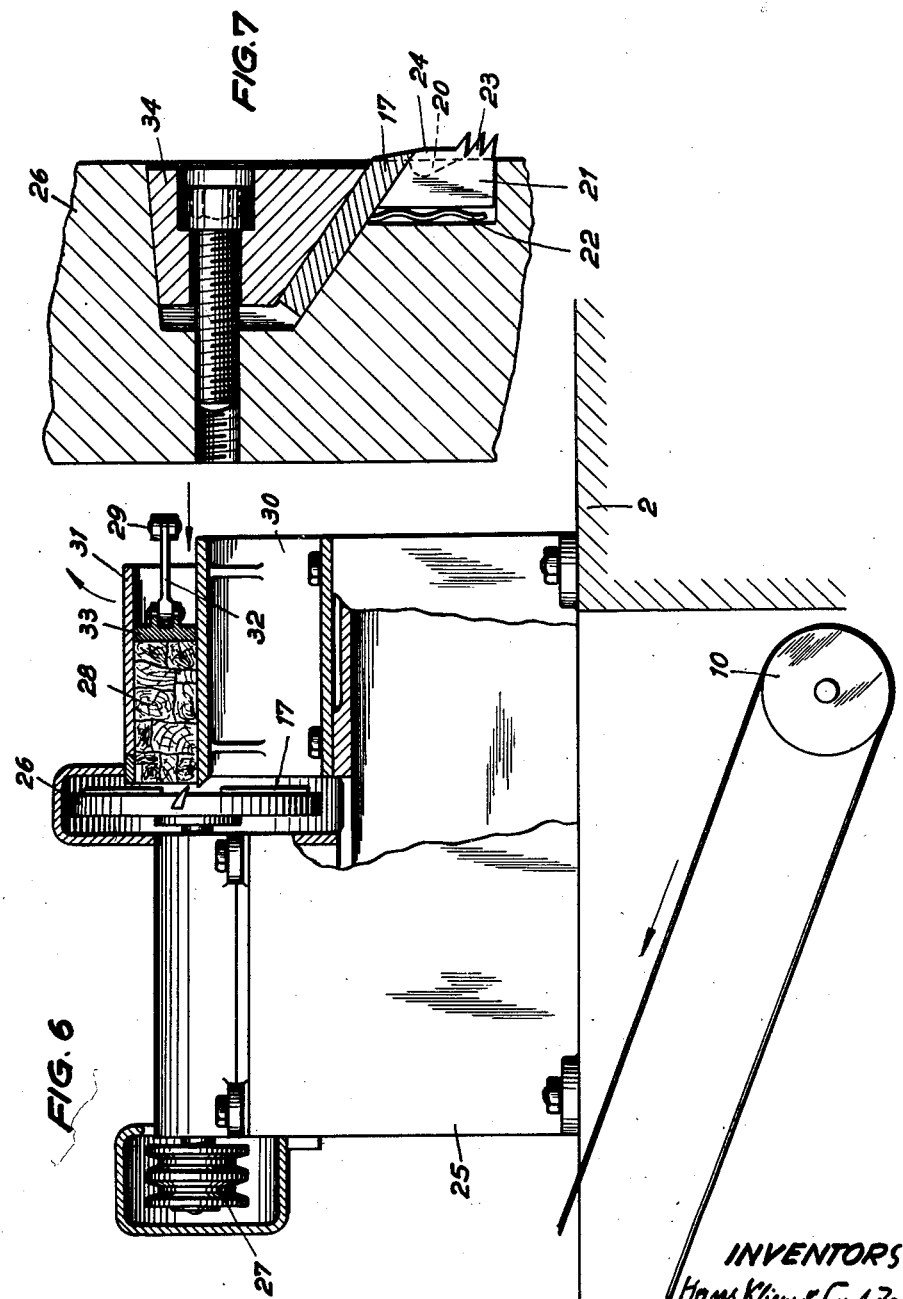

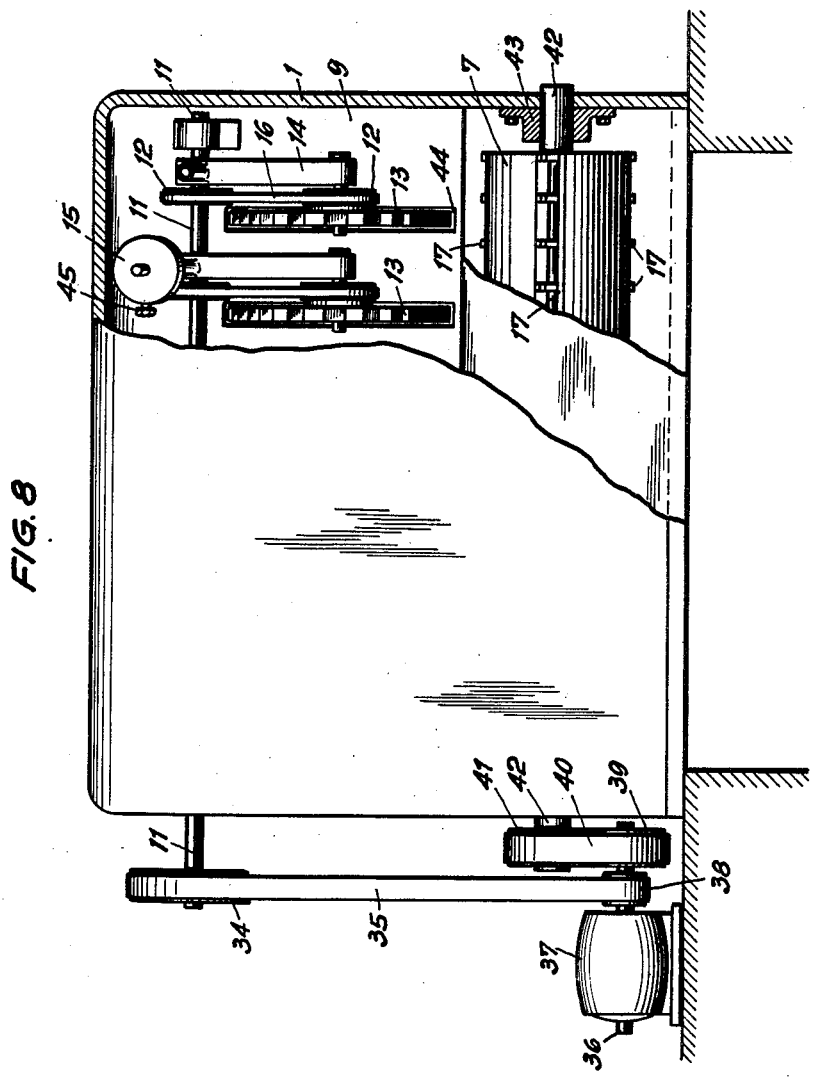

March 12, 1957 H. H. R. KLIEM ET AL 2,784,753
MACHINE FOR CHIPPING WOOD
Filed May 14, 1952 5 Sheets-Sheet 5

INVENTORS
Hans Kliem & Kurt Zaage
by Armand E. Mestern
Attorney

2,784,753
MACHINE FOR CHIPPING WOOD

Hans Hendrich Rudolf Kliem and Curt Gerhard Erwin Zaage, Wilhelmshaven, Germany, assignors to Mobelfabrik Westfalia H. Rottmann, Wilhelmshaven, Germany Application May 14, 1952, Serial No. 287,752

2 Claims. (Cl. 144—42)

The present invention relates to a machine for chipping wood, especially waste-wood, for the manufacture of chip-boards.

It is well known how to manufacture chip-boards from waste-wood of every kind, such as less valuable clog-wood and waste-wood from sawmills and woodworking shops. For this purpose, the waste-wood is usually steamed, disintegrated, dried, and after being mixed with a binder, e. g. glues and artificial resins, pressed by subjecting the mixture to high pressure and heat. For distintegrating the wood, chopping machines, planer-slides, endless belts and rollers provided with carvers and planing blades are in common use.

Two wooden particles of mixtures produced by chopping machines are generally very coarse and require therefore relatively high amounts of binders and high pressure in the manufacture of boards. These boards are very heavy and of low mechanical strength, and they are not easy to be nailed and screwed and not fit for manufacturing furniture.

The disintegrating machines of the wood-planer type are rather complicated and expensive, produce shavings of uneven size, of large width and length, and especially of greatly varying thickness. Consequently, the shavings require an additional, thorough, and very time-wasting treatment by screening and re-cutting to size. They must be moved from one place to another in a complicated manner and only with difficulty can they be distributed uniformly on the pressing-plates. Furthermore, owing to their varying length, width, and thickness, they require relatively large amounts of binders and high pressures, and this increases the specific gravity in an undesired degree. Finally, the chip-boards do not satisfy as regards their bending, screwing and nailing strength. The main reason for this is that the above-mentioned chipping machines cut the wood obliquely, or even transversely, to the direction of its fibers. The chips have, therefore, but a low strength and are easily torn.

It is the object of the present invention to obtain a simple and cheap wood-chipping machine, which can be easily operated, which avoids the above-mentioned disadvantages and which is capable of producing chips of small thickness, of uniform length, and extreme width, preserving the longitudinal fibers as well as possible.

The invention consists of a wood-chipping machine with a revolving support for the cutting tools, e. g. a revolving disk or roller. This revolving support is arranged in such a manner with respect to the wooden pieces, which are being continuously fed to it, that the cutting tools, preferably consisting of common planer-blades, extend with their straight edges parallel to the fibers of the wood and peel the chips in circumferential direction. This way of peeling avoids destruction of the longitudinal fibers and produces the effect that the chips do not roll, but remain flat and even.

Other objects and advantages of the machine according to the invention will become apparent from the following detailed description and the accompanying drawings.

In order to obtain chips of low thickness and uniform length, immediately in front of the cutting tools, which are fastened as usual at the revolving supports by means of wedge-shaped tie-clamps, precutters are inserted in definite intervals corresponding to the desired length of the chips; these precutters penetrate the wood to be chipped, only up to a depth corresponding to the thickness required for the chips. The precutters divide at equal intervals relatively flat chip-discharging grooves, arranged in front of the cutting tools and along them, and having nearly the same width as the one desired for the chips. Only the front parts of the precutters are toothed, while their rear ends, nearly corresponding with the width of the chip-discharging grooves, are shaped as smooth glide-ridges. While the flat chip-discharging grooves effect the peeling of relatively broad chips and contribute to stretching them against their inherent rolling tension, the precutters, according to the invention, are avoiding an unintended increase in thickness of the chips. This is accomplished by the fact that the woods, by means of the smooth glide-ridges are led into the slits sawed-in by the precutters and are prevented from penetrating more deeply into the chip-discharging grooves. By varying the height of the smooth glide-ridges, the thickness may be accurately adjusted.

In order to achieve that the wood pieces remain during the chipping in a position with their longitudinal fibers lying parallel to the edges of the cutting tools, they are, according to another feature of the invention, guided to the cutting tools and secured against repelling by coarse, preferably toothed disks which are arranged transversely to the wood pieces and driven at a speed adjusted to the cutting velocity. To make adjustment for the various sizes of the wood pieces possible, the driving disks are suitably arranged on spring-controlled or weighted levers, which are pivotally mounted on an intermediate shaft carrying driving wheels for the driving disks.

The invention will now be more fully described with reference to the accompanying drawings which illustrate two embodiments of the machine.

Figure 9:
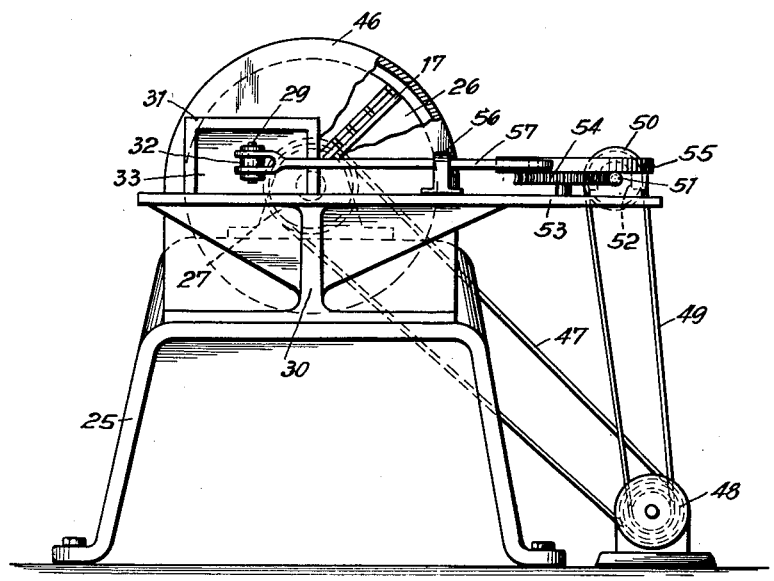

In the drawings:

Fig. 1 shows the chipping machine with its cutter shaft in cross-section;

Fig. 2 a cross-section of the cutter shaft shortly ahead of a precutter;

Fig. 3 a similar cross-section between two precutters;

Fig. 4 a side-view of a precutter;

Fig. 5 a top view of a cutter shaft;

Fig. 6 a chipping machine with a cutter disk in cross-section;

Fig. 7 a partial cross-section across the cutter disk;

Figs. 8 and 9 show side views of the machines of Figs. 1 and 6, respectively.

The chipping machine shown diagrammatically in Fig. 1 is housed within a casing 1, preferably made of welded steel sheets and built on a base or an iron-bed-plate 2. Within the housing is a chute 4 extending obliquely toward the bottom and serving for the feeding of the wood to be chipped. The lower wall 5 of the casing 1 is rigid and carries a setting plate 6 adjustable with respect to the cutter shaft 7. The setting plate 6 may be fluted or toothed. By varying the relative position of the setting plate, the angle of pull may be determined as required. Moreover, it contributes to prevent the wood 3 from turning and from being pushed back during the chipping. The four top walls 8 and 9, tightly connected to each other, form the above mentioned chute 4.

The casing 9 carries an intermediate shaft 11 (diagrammatically shown) and connected to the main shaft 10. On the shaft 11, there are mounted guiding wheels 12 for pivotal levers 14 which are controlled by adjustable weights 15. Levers 14 support toothed wheels 13 which are connected to the driving wheels 12 by means of chain 16 (the latter being shown diagrammatically only). The driving disks are, due to their pivotal mounting, self-adapting to the different sizes of the wood pieces and they prevent, together with the setting plate 6, the wood pieces from becoming pushed back.

The propulsion means 12 of the drive disks 13, except for the slots for receiving said drive disks, are separated from the chute 4 by the upper wall 9, so that, when damages of the machine occur, no fragments can enter the chute 4 and injuries of the cutter shaft 7 are avoided. The above mentioned propulsion means are covered, furthermore, on the outside by the casing parts 18 protecting them against dirt and foreign bodies or particles of wood. This part of the casing may be made removable.

The cutter shaft 7, arranged at the lower part of chute 4, carries the planer blades 17 and is of a construction commonly used for wood planers (Figs. 2 and 3). Thus, the planer blades 17 are adjustably clamped to the cutter shaft by means of chucking wedges 19. These chucking wedges 19 are provided with relatively flat grooves 20 for the discharge of chips, the grooves being arranged along the planing blades 17 immediately in front of them and having a width of about the one desired for the chips. In definite intervals convenient to the required length of the chips, there are inserted into the shaft 7 and transversely with respect to the blades 17, precutters 21, controlled by springs 22. The precutters have short-toothed front parts 23 and smooth glide ridges 24, extending nearly corresponding to the width of the chip-discharge grooves 20. While the short-toothed front parts 23 of the precutters 21 cut into the wood pieces 3 only up to a predetermined depth corresponding to the desired thickness of the chips, the smooth glide ridges 24 serve to lead the wood pieces 3 into the slots produced by the toothed front parts 23 and because of this arrangement of ridges and slots secure them against further penetrating into the chip-guiding grooves 20. By this arrangement, a non-intended increase of the thickness of the clips is eliminated.

When the machine is operating, the wood pieces are fed into the chute 4 in such a way that their longitudinal fibers are parallel to the edges of the planing blades 17, these blades peeling off from the wood thin chips in circumferential direction. While this is being done, the chips having bent surfaces owing to the roundness of the pieces to be chipped, are already bent back by the planer blades 17, and are entirely flattened and stretched in the flat chip-leading grooves. Consequently, very thin, wide and practically even chips of uniform length are produced.

The machine shown in Figs. 6 and 7 is operating in a similar manner as described before. It serves for working up smaller waste-wood pieces, especially in carpenter shops. This machine is likewise accommodated in a casing 25 preferably consisting of welded steel sheets and built upon a base or a bed plate. Instead of the cutter shaft 17, shown in Figs. 1-5, this device has a cutter disk 26 which is fitted with planer blades 17 and whose horizontal driving shaft is in connection with the main drive 10 by means of a V-belt 27 in a known manner (not shown). For the feeding of the waste-wood pieces 28, there is arranged a horizontal channel 29, e. g. of square cross-section, its side- and bottom-walls being formed by a bracket 30. At the top, it is closed by a lid 31 which may be turned upward in the direction of the arrow. The channel is displaced laterally with respect to the axis of the cutter disk 26 so that the blades, while operating, strike the wood pieces vertically from the top and peel them sideways. The wood pieces are preferably piled outside the machine in staples corresponding to the shaft or channel and then fed into the machine in such a manner that their longitudinal fibers in the operating position are lying at right angles to the plane of the drawing and consequently parallel to the planer blades 17. The wood pieces are pushed against the cutter disk 26 by a plunger 32 driven e. g. by an eccentric wheel; plunger 32 is journalled to a piston 33 and driven at a speed convenient to the cutting velocity.

Similar to the embodiment of the invention shown in Figs. 1-5, in the example shown in Figs. 6-7 the planer blades are likewise adjustably clamped to the cutter disk 26 by means of chucking wedges 34. The chip-guiding grooves 20 and the precutters 21 are the same as in the embodiment described above.

Fig. 8 shows the wood chipping machine in the embodiment of Fig. 1 as seen from the left-hand side, part of the casing being broken away so as to show the interior. At the top, the arrangement of the intermediate shaft 11 and the drive wheels 12 is illustrated. Shaft 11 projects at the left-hand side from the casing and carries a pulley 34 fixed thereto. An electric motor 37 is connected with its shaft 36, which likewise carries a pulley 38, with pulley 34 by means of a belt 35. The motor shaft 36 carries a further pulley 39 making connection, by means of a belt 40, with a pulley 41 fastened on the shaft 42 of the cutter shaft 7. Shaft 42 is rotatably mounted on both sides of the casing in bearings 43.

Slots 44 through which the drive disks 13 are admitted into the interior of the feeding chute 4, are shown in this figure. A further illustration is given of one of the weights 15, which can be fastened by means of a screw 45 after it has been brought into proper position on the associate lever 14.

Fig. 9 is a view of the embodiment of the machine illustrated in Figs. 6 and 7 and shows the machine as seen from the right-hand side. The horizontal feeding chute 29 and its relative position to the cutter disk 26 are shown by partial breaking off of the surrounding casing 46. The drive of disk 46 is effected by a V-belt 47 carried on V-belt pulley 27 and driven by an electric motor 48. Further shown in the drawing are a pulley 50 which is driven from the same electric motor 48 by means of another V-belt 49; disk 50 in turn drives a worm shaft 51. Bearings 52 for the disk 50 and the worm shaft 51 are shown in dotted lines, said bearings being fastened to a table 53. The worm 51 is in engagement with a worm gear 54 fixedly connected to an eccentric disk 55 and being supported together with the same on the table 53. A lever 57 pivotally mounted in a supporting bracket 56 is in engagement with disk 55, said lever being controlled by a spring (not shown) causing it to sweep over the disk 55 and being at its other, fork-shaped, end pivotally connected with the plunger 32. The lever is hinged to the piston 33 which presses the wood to be chipped against cutter disk 26.

The machine according to the invention may be modified in its structure, especially as regards the construction of the casing, the fastening of the planar blades, of the driver disks and the setting plates. Owing to its simple and practical construction, the machine can be built at a low price and is easy to operate. It fully converts into chips the wood pieces fed to it, so that no coarse residues enter the mixture of chips. Besides that, this mixture contains but a small amount of undesirable dust and chips of very small size. Above all, the mixture of chips consists of plane chips of uniform small thickness and equal length, which are capable of being withdrawn from the cutter shaft and from the cutter disk, respectively, without any auxiliary means. They are supplied to drying and mixing devices without any sifting or other subsequent working. The mixture may be sprinkled uniformly and in a simple manner upon the pressing plates, there to be converted by a single operation into chip boards, by means of heat and pressure. Due to the relative width of the chips and due to their flat and even shape, the amount of binders as well as the pressure can be kept relatively low.

As a consequence of the homogeneity of the chips and of the conservation of the longitudinal fibers, the boards show high bending-, nailing- and screwing-qualities. They have very smooth surfaces which can remain in their original state or can be veneered without any preceding covering by plywood. Due to the small amount of binders, the chip boards have a relatively low specific gravity.

What we claim is:

1. A waste wood chipping machine for the manufacture of chips to be used in making boards therefrom, said machine being of the type comprising a bed plate, a revolving support mounted on said plate for carrying cutting tools including planar blades and precutters, a feeding chute leading the waste wood to the cutting tools, said revolving support comprising flat chip-discharging grooves immediately in front of the planer blades, said precutters also being arranged immediately in front of and adjacent to the planer blades, the height of the precutters, as well as the depth and the width of the chip-discharging grooves being selected to control the desired thickness and width, respectively, of the chips and the distance between the precutters corresponding to the desired length of the chips, said precutters having a toothed front part and a blunt part adjacent to the planer blades, said toothed part projecting above said blunt part for a distance corresponding to the desired thickness of the chips to be cut, said feeding chute being associated with means for delivering waste wood to the cutting tools in such a position that the fibers of the waste wood to be chipped lie parallel to the edges of the planer blades during the chipping section.

2. In a wood chipping machine for the manufacture of small uniform chips of comparatively small thickness and especially adapted for producing chips from waste wood and having a bed-plate, a revolving roll support fitted with a single sheet mounted thereon, precutter blades and planer blades mounted on said support and means for feeding wood to said blades positioned with its grain parallel to said blades, that improvement comprising an oblique descending feeding chute defining a wedge-shaped space for holding the wood being chipped by the cutting elements on said shaft an adjustable toothed setting plate at the back wall of said feeding chute, said precutters on said roll support having a toothed front part and a blunt rear part adjacent the planer blades, said front part being flush with said planer blades and fitted to the part projecting above said blunt part for a distance corresponding to the thickness of the chips being cut, whereby said rear parts of said precutters form flat chip-discharging grooves which peel chips of even thickness from the wood which is fed and whereby the pull of said wood is controlled by said adjustable toothed setting plate.

References Cited in the file of this patent

UNITED STATES PATENTS

| | | |
|---|---|---|
| Re. 7,143 | Coogan | May 30, 1876 |
| 224,002 | Doane | Feb. 3, 1880 |
| 1,515,377 | White | Nov. 11, 1924 |
| 1,591,801 | Andresen | July 6, 1926 |
| 1,861,787 | Buchan | June 7, 1932 |
| 2,004,367 | Brown | June 11, 1935 |

FOREIGN PATENTS

| | | |
|---|---|---|
| 197 | Great Britain | of 1856 |
| 2,261 | Great Britain | of 1867 |
| 296,845 | Germany | Mar. 8, 1917 |